Dec. 6, 1949     C. W. CRUMRINE     2,490,017
ANIMAL TRAP

Filed Dec. 20, 1944     4 Sheets-Sheet 1

*INVENTOR.*
Chester W. Crumrine
BY
Bean, Brooks, Buckley & Bean. *Attorneys*

Dec. 6, 1949    C. W. CRUMRINE    2,490,017
ANIMAL TRAP
Filed Dec. 20, 1944    4 Sheets-Sheet 4

INVENTOR.
CHESTER W. CRUMRINE
BY
Bean, Brooks, Buckley & Bean. Attorneys.

Patented Dec. 6, 1949

2,490,017

UNITED STATES PATENT OFFICE 2,490,017

ANIMAL TRAP

Chester W. Crumrine, Irondequoit Township, Monroe County, N. Y., assignor, by mesne assignments, to L F C Corporation, Rochester, N. Y., a corporation of New York Application December 20, 1944, Serial No. 568,942

8 Claims. (Cl. 43—98)

This invention relates to animal traps and particularly to traps which operate automatically to effect a trapping and resetting cycle of operation.

The present trap is so arranged that when it is in position for operation it affords a very substantial trapping zone. However, when the trap of the present invention is not in use, it may be closed up or folded so that it occupies a very small compass and is readily portable.

Many other novel features and advantages will appear from a consideration of the following description of a single exemplary embodiment of the trap of the present invention taken in conjunction with the accompanying drawings. It is to be understood, however, that the scope of the invention is limited only as defined in the appended claims and reference to the specific embodiment described herein is by way of example only.

In the drawings:

Fig. 5 is a fragmentary cross sectional plan view through the hinge portions of a pair of animal trapping elements; and Fig. 6 is a wiring diagram showing the motor control circuit.

Figure 1:
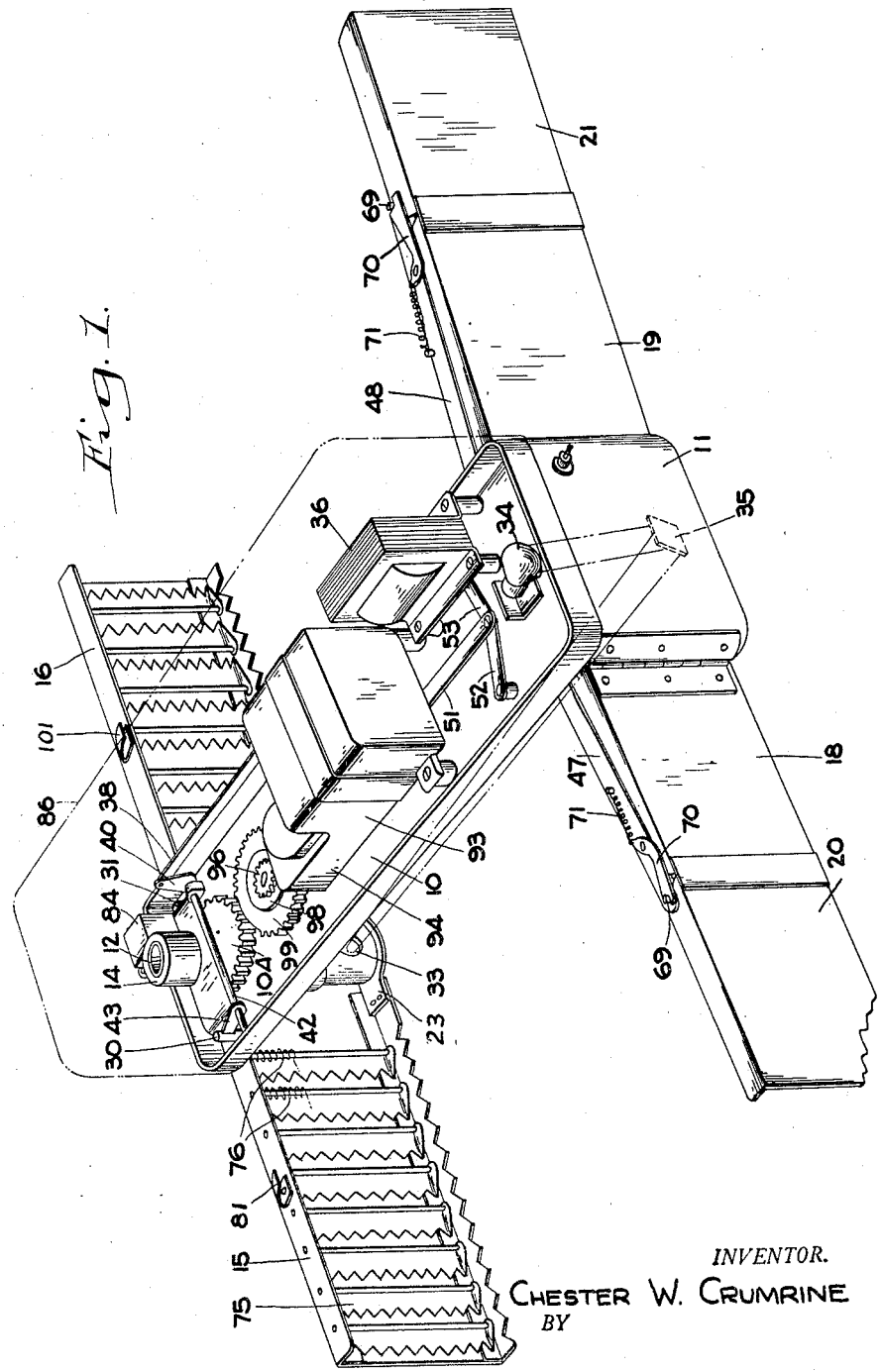
Fig. 1 is a perspective view of the trap in set position with an upper casing portion thereof indicated in phantom lines.

Throughout the several figures of the drawings like characters of reference denote like parts and the numeral 10 indicates a base or platform element which forms a bridge or ceiling over the animal trapping area and also forms a supporting base for the various trap operating instrumentalities. The platform 10 is relatively elongated and includes a depending supporting wall portion 11 at one end thereof and is indirectly supported at its opposite end by a relatively stationary tube 12 having a base flange 13 secured thereto. The tube 12 has pinned or otherwise fixed to its upper end a collar 14 which includes base flanges extending in opposite directions to straddle certain gear elements and seat against the upper surface of base 10 as at 17 in Fig. 2.

The numerals 15 and 16 designate a pair of cooperating plate elements which swing about a common vertical axis which coincides with the axis of tube 12. Speaking generally, and beginning with the position illustrated in Fig. 1 the plates 15 and 16 swing toward each other with extreme rapidity to trap an animal beneath the platform 10, and then rotate together in a counter-clockwise direction as viewed in Figs. 1, 2 and 3 to effect release of the body of the trapped animal and to move to re-set position for a subsequent trapping cycle.

The supporting wall portion 11 has plates 18 and 19 hinged to its opposite vertical edges and the plates 18 and 19 in turn have hinged to their outer vertical edges similar plates 20 and 21, respectively. When the trap is in set position the plates 18 through 21 assume the straight line relationship indicated in Figs. 1 and 3 and thus cooperate with the plates 15 and 16 to provide a large, straight and entirely unobstructed animal passageway therebetween. However, the initial movement of the animal trapping plates 15 and 16 toward each other to trap an animal is accompanied by simultaneous movement of the plates 18 through 21 to the position of Fig. 2, where they form a generally arcuate boundary to the trapping zone, the zone so defined being quickly and completely traversed by plates 15 and 16 in trapping an animal.

Figure 3:
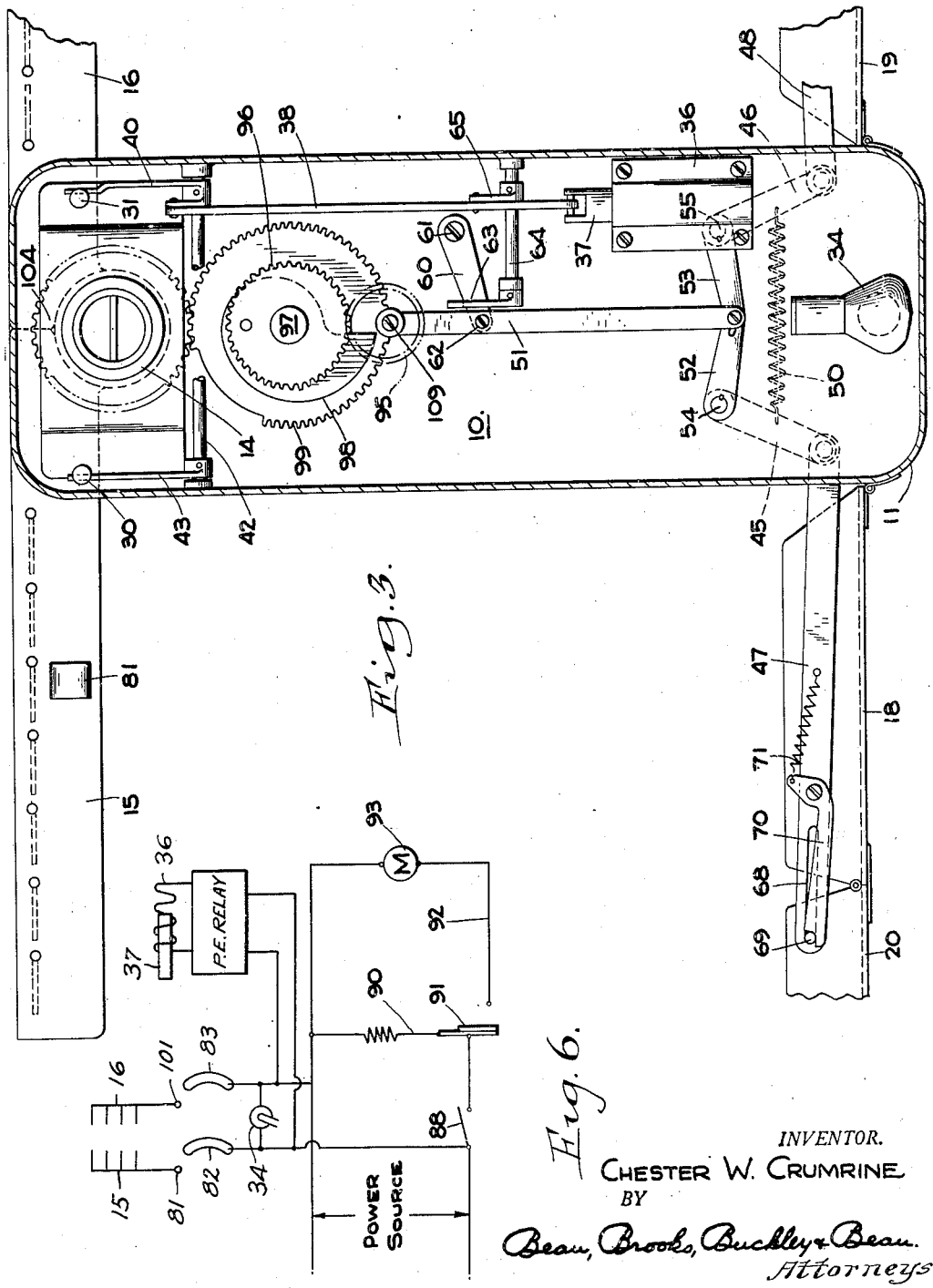
Fig. 3 is a view similar to Fig. 2 but with the parts of the trap approaching the final stages of a resetting operation.
Figure 4:
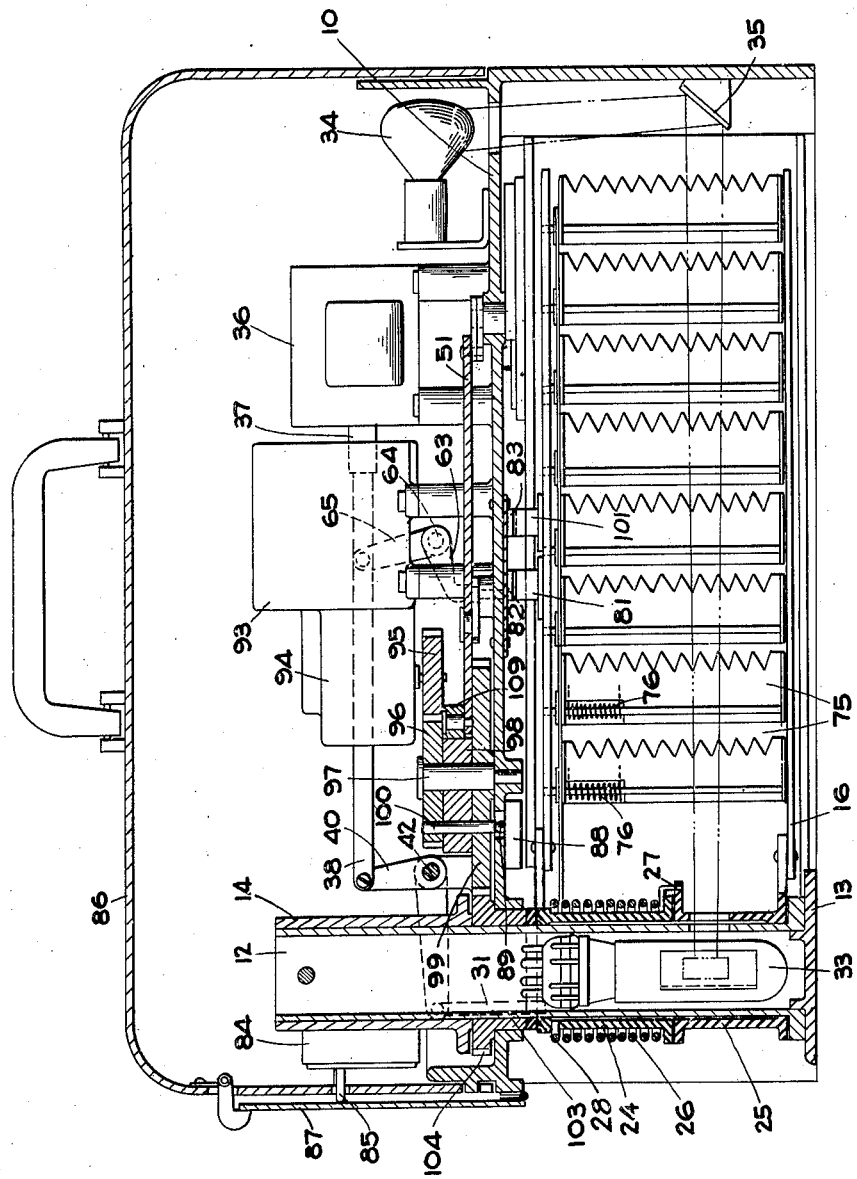
Fig. 4 is a longitudinal cross sectional view taken on a vertical plane.

The plate 15 is secured to an upper bearing portion 24 of insulating material, see Fig. 4, the parts 15 and 24 may be connected by overlapping and riveting as clearly shown at 23 in Fig. 5, which is rotatably disposed about tube 12. The other plate 16 is fixed to a lower bearing portion 25 of insulating material in the same manner as in the case of plate 15 as at 28 in Fig. 5 and bearing portion 25 likewise is disposed about tube 12 in end to end relation with respect to bearing 24. A torsion coil spring 26 is disposed about the bearing 24 as at 28 and has its upper end secured to bearing 24 and its lower end secured to bearing 25 as at 27. The arrangement of the trap is such that when in set position, as in Figs. 1 and 3, the spring 26 is loaded or stressed in such manner as to urge the plates 15 and 16 toward each other to a position beneath the platform 10. While the trap is set such movement is prevented by a pair of latch pins 30 and 31 which extend downwardly through the base 10 and engage openings in the plates 15 and 16, respectively, which openings register with the latch pins when the plates 15 and 16 are in the set position of Figs. 1 and 3.

The tube 12 houses a light sensitive cell 33 and a light source is provided in the form of a lamp 34 which may be supported upon base 10. In Fig. 4 the numeral 35 designates a mirror or other reflecting agency for directing a beam of light from lamp 34 to the photo electric cell 33. The cell 33 may comprise part of a conventional photo electric relay arranged in a manner well known to those skilled in the art in such fashion that interruption of the light beam from lamp 34 to cell 33 momentarily energizes an electromagnet 36, the latter being likewise supported upon base 10.

The electromagnet 36 has an armature 37 which is attracted thereby upon energization and thus imparts longitudinal movement to a bar 38 which connects with one arm of a bell crank 40. The other arm of bell crank 40 pivotally engages latch pin 31 and the bell crank is fixed to a rock shaft 42. Rock shaft 42 carries an arm 43 which pivotally engages the other latch pin 30 and it will be seen from the foregoing that momentary energization of the magnet 36 raises both latch pins and thus releases the plates 15 and 16 for sudden movement to animal clamping and trapping position under the impetus of spring 26.

Simultaneously the plates 18 through 21 are moved to the position illustrated in Fig. 2 in a manner which will now be described. Referring to Fig. 3, the base 10 has pivotally disposed at its under side a pair of arms 45 and 46 the outer ends of which pivotally engage links 47 and 48, respectively. In the set position illustrated in Fig. 3 an extension coil spring 50 urges the arms 45 and 46 and the links 47 and 48 toward each other, but such movement is restrained by the cooperation of a bar 51 which has one end pivotally engaged with the outer ends of a pair of arms 52 and 53. The arms 52 and 53 are fixed to rock shafts 54 and 55, respectively, and arms 45 and 46 are likewise fixed to rock shafts 54 and 55, respectively, whereby the arms 52 and 53 oscillate with arms 45 and 46, respectively.

An arm 60 is pivotally secured to the base 10 as at 61 and has its outer end pivotally attached to the bar 51 as at 62. A latch 63 is fixed to a rockshaft 64 and the rockshaft 64 also has fixed thereto an arm 65 whose outer end is pivoted to the bar 38. From the foregoing it will be seen that, other conditions permitting, movement of the bar 38 by the magnet 36 to release latch pins 30 and 31, simultaneously releases latch 63 and thus permits the arms 45 and 46 to move abruptly toward each other under the impetus of spring 50. The outer ends of links 47 and 48 have slots 68 which pivotally engage pins 69 carried by the end plates 20 and 21.

Figure 2:
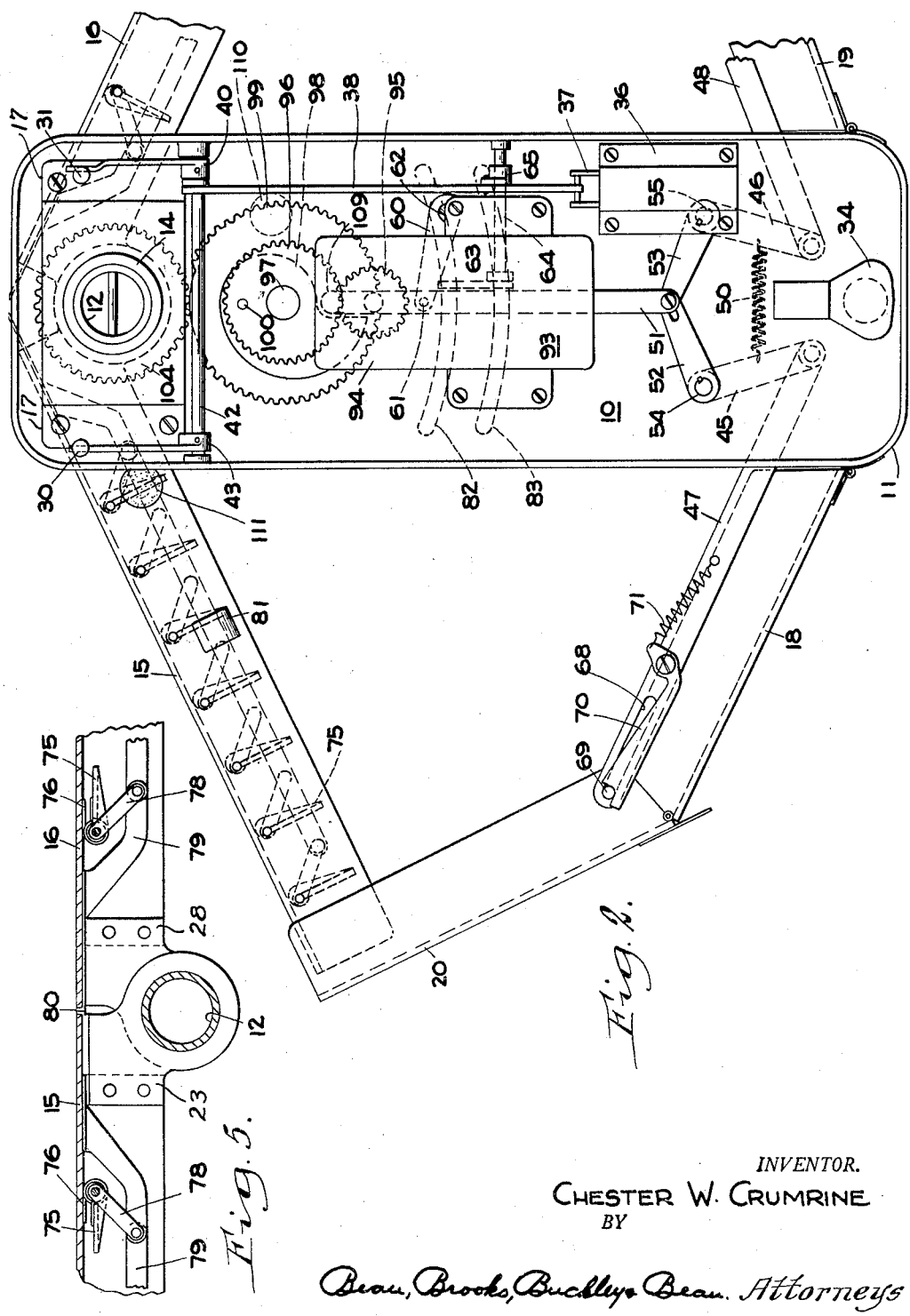
Fig. 2 is a top plan view, with portions broken away and with the trap in the process of effecting an animal trapping operation.

The upper and lower flanges of the plates 18 through 21 are beveled as indicated in Fig. 3, so that movement of the links 47 and 48 toward each other during the trapping operation automatically disposes the plates 18 through 21 in the relative positions illustrated in Fig. 2. Rocker arm latches 70 normally retain pivot pins 69 in the outer ends of the slots 68, the positions of the latches 70 being resiliently maintained by extension springs 71. The slotted construction and the latches 70 are provided only so that the latter may be released when the trap is to be collapsed for portability. When the latches 70 are released the plates 18 and 20, for example, may be pivoted to a position where they are in end to end straight line relation with respect to each other and extend vertically as viewed in Figs. 2 and 3. In this position their outer surfaces form a co-planar downward continuation of the edge of base 10. Similarly the plates 19 and 21 may be disposed in a straight line beneath the opposite edge of base 10. When the trap is being prepared for portability in this manner, the latches of plates 15 and 16 are first released, so that they lie between the plates 18 through 21.

The discussion of the trap springing operation has pre-supposed that the torsion spring 26 and the extension spring 50 were preliminarily loaded or tensed sufficiently to rapidly and effectively accomplish the actual trapping operation. The manner in which this condition is automatically brought about during resetting of the trap will presently be set forth.

It will be noted that the facing sides of the plates 15 and 16 have a series of vertically pivoted bars 75 having their outer edges serrated as shown. With the trap in set position, as shown in Figs. 1 and 3, the bars 75 lie along plates 15 and 16 so as not to arouse undue suspicion. However, one or more of the bars 75 are provided with torsion springs 76 which urge the bars 75 to the perpendicular position shown in Fig. 2. The several bars have pivot arms 78 as shown in detail in Fig. 5 and the several arms 78 connect with a common link 79 for each of the plates 15 and 16. The adjacent ends of the links 79 abut as shown at 80 in Fig. 5 when the trap is set and the bars are thus held in their flat or folded position. When the trap is sprung and the plates 15 and 16 begin to pivot toward each other the links 79 move out of endwise abutment and the springs 76 dispose the bars in their perpendicular position.

The under side of the base 10 has a pair of arcuate bus bars or contact strips 82 and 83 which comprise the opposite terminals of an ordinary 110 volt light circuit or other source of power. Each of the plates 15 and 16 has an upper contact, 81 and 101 respectively, so spaced from the pivotal connection of the plates 15 and 16 as to engage the terminal strips 82 and 83, respectively, as the panels 15 and 16 move to trapping position. In this manner an animal caught between the plates 15 and 16 is electrocuted. A master switch 84 is in the electrocuting circuit and is shown in Figs. 1 and 4. The switch is normally open and has a depressible closing button 85 extending through the wall of a top cover element 86. As appears from Fig. 4, a hinged door 87 is provided for closing the end of the space beneath base 10 when the trap is folded. To condition the trap for operation it is necessary to latch the door 87 in raised position, as shown, to close switch 84.

Springing of the trap likewise results in the closure of a switch 88 which is of the normally closed type but is held open when the trap is set by certain gear mechanism to be described later herein. The switch 88 has a resiliently depressible button 89 extending upwardly through base 10 where it registers with a pin associated with the gear mechanism referred to when the trap is set. Referring to the fragmentary wiring diagram, Fig. 6, closure of the switch 88 may close a preliminary circuit 90 including the bi-metal 91. When the bi-metal is sufficiently heated it further closes a circuit 92 which includes an electric motor 93. The bi-metal is provided to insure a sufficient time delay to effectively electrocute the trapped animal.

The motor 93 appears best in Fig. 1 and has associated therewith a suitable reducing gear 94, the output shaft of which has fixed thereto a pinion 95. The pinion 95 drives a gear 96, see Figs. 2 and 4, which is supported by a stub shaft 97 associated with the base 10. A cam 98 and a mutilated gear 99 are fixed for rotation with gear 96 by means of a pin 100, see Fig. 4. It will be noted that the lower end of pin 100 projects below gear 99 and opens switch 88 when the trap reaches fully set position, thus stopping motor 93.

In addition to the lower bearing 25 the panel 16 has an upper bearing portion 103 which includes a gear 104 which cooperates with the mutilated gear 99. After a sufficient electrocution period has elapsed and the bi-metal 91 closes the circuit of motor 93, rotation of the gear 96 rotates the cam 98 and a mutilated gear 99. This rotation begins with the cam 98 and the various gears in the position illustrated in Fig. 2 and rotation of the shaft 97 is clockwise. The cam 98 thus moves bar 51 through cooperation of a follower 109 carried by bar 51 and the plates 18 through 21 are re-disposed in the position of Fig. 3. As they reach their final set position latch 63 engages arm 60 so that as the cam rise leaves follower 109 the arm 51 and the parts operated thereby, including the plates 18 through 21, are retained in set position. At the same time rotation of gear 99 brings it into mesh with gear 104 and gear 104 is rotated in a counter-clockwise direction. In Fig. 2 the numeral 110 designates a friction disc secured to the under side of base 10 and 111 designates a friction disc secured to the top of plate 15 and the discs 110 and 111 come into registry during resetting. The plates 15 and 16 are rotated in synchronism by gear 104 until discs 110 and 111 come into registry which occurs preferably after the plates have moved about 45 degrees beyond trapping position. Continued rotation of gear 104 then moves plate 16, which is not restrained by friction disks 110 and 111, away from plate 15 and tenses spring 26. When plate 16 has moved 180 degrees away from plate 15 their hinged edges come into positive abutment and the frictional brake 110, 111 is positively overcome.

As soon as the discs 110 and 111 are out of registry the tension of spring 26 causes plate 15 to throw or sling the animal body clear of the trap in an angular direction so as to likewise throw the animal body clear of the line leading to the trap passageway. In this movement plate 15 will partially or wholly overtake plate 16 which is still being rotated by the motor 93 through gear 94. When plate 15, in its continued counter-clockwise rotation, reaches its set position of Figs. 1 and 3, latch pin 30 automatically engages it and arrests its further rotational movement. Plate 16, however, continues to be driven and the spring 25 is accordingly re-energized, until plate 16 reaches its original set position of Figs. 1 and 3, spaced 180 degrees from plate 15. Plate 16 is then engaged by latch pin 31. The trap is then ready to be sprung again whenever passage of an animal body beneath the base or platform 10 interrupts the light beam.

I claim:

1. An animal trap comprising a pair of spaced supports each having pivoted thereto a pair of oppositely projecting plate means, whereby each pair of plate means extends substantially lineally and parallel to and spaced from the other pair to define a straight uninterrupted animal passageway therebetween, a connecting element extending across said spaced supports and spaced above said plate means whereby to bridge said passageway, and means for rapidly swinging said several plate means toward each other to trap an animal between a pair of said plate means.

2. An animal trap comprising a pair of spaced supports each having pivoted thereto a pair of oppositely projecting plate means, whereby each pair of plate means extends parallel to and is spaced from the other pair to define a straight uninterrupted animal passageway therebetween, a connecting element extending across said spaced supports and spaced above said plate means whereby to bridge said passageway, and means for rapidly swinging the plate means of one pair toward each other to trap an animal therebetween.

3. An animal trap comprising a pair of spaced supports each having pivoted thereto a pair of oppositely projecting plate means, whereby each pair of plate means extends substantially parallel to and is spaced from the other pair to define a straight uninterrupted animal passageway therebetween, a connecting element extending across said spaced supports and spaced above said plate means whereby to bridge said passageway, means for swinging one of said pairs of plate means toward the other to constrict the passageway, and means for substantially simultaneously moving the plate means of the other pair toward each other to trap an animal therebetween.

4. An animal trap comprising a pair of spaced supports each having pivoted thereto a pair of oppositely projecting plate means, whereby each pair of plate means extends parallel to and is spaced from the other pair to define a straight uninterrupted animal passageway therebetween, a connecting element extending across said spaced supports and spaced above said plate means whereby to bridge said passageway, means for moving said plate means toward each other to trap an animal therebetween, and means in said connecting element and sensitive to the presence of an animal therebeneath for actuating said plate moving means.

5. A portable animal trap comprising a pair of spaced supports each having pivoted thereto a pair of oppositely projecting plate means, whereby each pair of plate means extends parallel to and is spaced from the other pair to define a straight uninterrupted animal passageway therebetween, a connecting element extending across said spaced supports and spaced above said plate means whereby to bridge said passageway, and means for moving said plate means toward each other to trap an animal therebetween, said plate means being selectively movable upon their pivotal connections with said supports to dispose all of them beneath said connecting elements and within its confines for transporting said trap.

6. A portable animal trap comprising a pair of spaced supports each having pivoted thereto a pair of oppositely projecting plate means, whereby each pair of plate means extends parallel to and is spaced from the other pair to define a straight uninterrupted animal passageway therebetween, a connecting element extending across said spaced supports and spaced above said plate means whereby to bridge said passageway, means for rapidly swinging the plate means of one pair toward each other to trap an animal therebetween, means associated with said plate means for electrocuting said animal, and means for subsequently automatically rotating said pair of plate means to eject said animal body and return the plate means of said pair to reset position.

7. An animal trap comprising an elongated member and means at opposite ends thereof for supporting the same in elevated position, a pair of animal trapping elements pivoted to the support means at one end of said elevated member and extending horizontally therefrom in opposite directions and at substantially right angles to the elevated member when the trap is in set position, a pair of animal confining elements extending horizontally away from the other support means at substantially right angles to said elevated member with the trap in set position, whereby the trapping elements and the confining elements are parallel to each other and define a straight and uninterrupted trapping passage, said trapping elements being movable rapidly toward each other to a position beneath the bridge member to traverse said passage and trap an animal therebetween, and means sensitive to the presence of an animal beneath said bridge member for so actuating said trapping elements.

8. An animal trap comprising an elongated member and means at opposite ends thereof for supporting the same in elevated position, a pair of animal trapping elements pivoted to the support means at one end of said elevated member and extending horizontally therefrom in opposite directions and at substantially right angles to the elevated member when the trap is in set position, a pair of animal confining elements extending horizontally away from the other support means at substantially right angles to said bridge member with the trap in set position, whereby the trapping elements and the confining elements are parallel to each other and define a straight and uninterrupted trapping passage, said trapping elements being movable rapidly toward each other to a position beneath the bridge member to traverse said passage and trap an animal therebetween, means sensitive to the presence of an animal beneath said bridge member for so actuating said trapping elements, and means operable automatically upon movement of the trapping elements for moving the confining elements partly toward the trapping elements to constrict the trapping passage.

CHESTER W. CRUMRINE.

No references cited.